United States Patent
Weber et al.

(10) Patent No.: US 9,676,360 B2
(45) Date of Patent: Jun. 13, 2017

(54) ATTACHMENT INTERFACE FOR A PYROTECHNIC ACTUATOR

(71) Applicant: Autoliv Development AB, Vårgårda (SE)

(72) Inventors: Marcus Weber, Untertheres (DE);
Raimund Nebel, Obermeitlingen (DE);
Johann Biberger, Wolnzach (DE);
Martin Haas, Altomünster (DE);
Roland Peiz, Hilgertshausen (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/030,267

(22) PCT Filed: Oct. 24, 2014

(86) PCT No.: PCT/EP2014/072887
§ 371 (c)(1),
(2) Date: Apr. 18, 2016

(87) PCT Pub. No.: WO2015/059292
PCT Pub. Date: Apr. 30, 2015

(65) Prior Publication Data
US 2016/0250990 A1    Sep. 1, 2016

(30) Foreign Application Priority Data
Oct. 25, 2013    (FR) ..................... 13 60455

(51) Int. Cl.
*B60R 21/217* (2011.01)
*B60R 21/2338* (2011.01)
(Continued)

(52) U.S. Cl.
CPC .......... *B60R 21/217* (2013.01); *B60R 21/239* (2013.01); *B60R 21/2338* (2013.01);
(Continued)

(58) Field of Classification Search
CPC .... B60R 21/217; B60R 21/264; B60R 21/239
See application file for complete search history.

(56) References Cited

U.S. PATENT DOCUMENTS 5,378,011 A * 1/1995 Rogerson .............. B60R 21/217
                                                    280/728.1
5,409,256 A * 4/1995 Gordon ............... B60R 21/2035
                                                    280/728.2
(Continued)

FOREIGN PATENT DOCUMENTS

DE    8417618 U1    10/1985
DE    4307774 A1    9/1994
(Continued)

OTHER PUBLICATIONS

International Search Report for PCT/EP2014/072887, ISA/EP, Rijswijk, NL, (English and French) mailed Nov. 25, 2014.
(Continued)

*Primary Examiner* — Darlene P Condra
(74) *Attorney, Agent, or Firm* — Stephen T. Olson; Harness, Dickey & Pierce, P.L.C.

(57) ABSTRACT

A safety module for a motor vehicle includes at least one inflatable cushion with a first fixation interface and at least one actuating device. The at least one actuating device includes an igniter and an igniter support. The igniter has a plastic overmolding forming a second fixation interface. The igniter support has a third fixation interface designed to receive and fix the second fixation interface. The at least one actuating device retains the first fixation interface by sandwiching it between at least one part of the second fixation interface and at least one part of the third fixation interface.

20 Claims, 4 Drawing Sheets

(51) Int. Cl.
  *B60R 21/264*  (2006.01)
  *B60R 21/239*  (2006.01)
(52) U.S. Cl.
  CPC .... *B60R 21/264* (2013.01); *B60R 2021/2395* (2013.01); *B60R 2021/23384* (2013.01)

(56) References Cited

U.S. PATENT DOCUMENTS

| | | | | |
|---|---|---|---|---|
| 5,427,406 | A * | 6/1995 | Zushi | B60R 21/217 280/728.2 |
| 5,433,147 | A | 7/1995 | Brede et al. | |
| 5,445,406 | A * | 8/1995 | Jones | B60R 21/217 280/728.2 |
| 5,509,685 | A * | 4/1996 | Boyle, III | B60R 21/217 280/728.2 |
| 5,560,643 | A | 10/1996 | Lang et al. | |
| 5,596,163 | A | 1/1997 | Caflisch et al. | |
| 5,791,682 | A | 8/1998 | Hiramitsu et al. | |
| 6,601,515 | B2 | 8/2003 | Bretfeld et al. | |
| 7,048,297 | B2 * | 5/2006 | Schneider | B60R 21/217 280/728.2 |
| 7,073,819 | B2 * | 7/2006 | Castagner | A41D 13/018 2/456 |
| 7,980,591 | B2 | 7/2011 | Schonhuber et al. | |
| 8,083,259 | B2 | 12/2011 | Schonhuber et al. | |
| 8,783,713 | B2 | 7/2014 | Muscat et al. | |
| 2002/0056394 | A1 | 5/2002 | Bretfeld et al. | |
| 2005/0046153 | A1 * | 3/2005 | DePottey | B60R 21/217 280/728.2 |
| 2009/0066067 | A1 * | 3/2009 | Meissner | B60R 21/217 280/735 |
| 2009/0167006 | A1 | 7/2009 | Schonhuber et al. | |
| 2009/0309342 | A1 | 12/2009 | Schonhuber et al. | |
| 2009/0315304 | A1 * | 12/2009 | Hagelgans | B60R 21/2035 280/728.2 |
| 2010/0090445 | A1 * | 4/2010 | Williams | B60R 21/2338 280/728.2 |
| 2010/0090455 | A1 | 4/2010 | Boswell et al. | |
| 2011/0101651 | A1 * | 5/2011 | Bierwirth | B60R 21/2644 280/728.2 |
| 2011/0285114 | A1 * | 11/2011 | Ohara | B60R 21/206 280/730.1 |
| 2013/0119645 | A1 | 5/2013 | Eckert et al. | |
| 2013/0328292 | A1 | 12/2013 | Muscat et al. | |
| 2014/0008901 | A1 * | 1/2014 | Kranzle | B60R 21/217 280/740 |
| 2014/0123869 | A1 * | 5/2014 | Ukita | B60R 21/264 102/530 |
| 2015/0329073 | A1 * | 11/2015 | Buchholz | B60R 21/239 280/737 |
| 2015/0343982 | A1 | 12/2015 | Fechner et al. | |

FOREIGN PATENT DOCUMENTS

| | | |
|---|---|---|
| DE | 19654314 A1 | 6/1998 |
| DE | 10024664 A1 | 11/2001 |
| DE | 102005058721 A1 | 6/2007 |
| EP | 0744323 A1 | 11/1996 |
| WO | WO-2012/072234 A1 | 6/2012 |
| WO | WO-2013/017228 A1 | 2/2013 |
| WO | WO-2014/128121 A1 | 8/2014 |

OTHER PUBLICATIONS

Written Opinion of the ISA for PCT/EP2014/072887, ISA/EP, Rijswijk, NL, (French) mailed Nov. 25, 2015.
International Search Report for PCT/EP2014/072873, ISA/EP, Rijswijk, NL, with English translation, mailed Jan. 16, 2015.
Written Opinion of the ISA, ISA/EP, mailed Jan. 16, 2015.

* cited by examiner

ATTACHMENT INTERFACE FOR A PYROTECHNIC ACTUATOR

CROSS-REFERENCE TO RELATED APPLICATIONS

This application is a 371 U.S. National Stage of International Application No. PCT/EP2014/072887, filed Oct. 24, 2014. This application claims the benefit of and priority to French Patent Application No. 1360455, filed Oct. 25, 2013. The disclosures of the above applications are incorporated herein by reference.

FIELD

The present invention relates in a general manner to a fixation interface for a pyrotechnical actuator arranged in a safety module for an automobile and in particular a safety module comprising an airbag with a vent, wherein the pyrotechnical actuator is designed to control the vent.

BACKGROUND

Devices for vent control are known in the prior art such as the one described in the document US20100090445 in which a pyrotechnical actuator is designed to cut a control linkage of an airbag vent. On the other hand, this system has in particular the disadvantage of comprising numerous parts with in particular a cutting blade, which increases the cost and the complexity of the proposed solution. Moreover, the fixation of the linkage is complicated because it is necessary to place the linkage at first into the cutting mechanism in order to then fix it around the pyrotechnical cutting actuator. The mounting operations are complex, which produces a risk of non-conformity.

In the case in which the cutting device is replaced by an inflatable cushion which controls the linkage, the fixation of the inflatable cushion is similar to that of the linkage in the above example and the same problems of the complexity of the fixation appear.

SUMMARY

A goal of the present invention is to respond to the disadvantages of the document of the prior art cited above and in particular, first of all, to suggest a fixation interface for an inflatable cushion which is economical and easy to mount.

To this end a first aspect of the invention relates to a safety module for an automobile, which module comprises:
  at least one inflatable cushion with a first fixation interface;
  at least one actuating device comprising:
  an igniter with a plastic overmoulding forming a second fixation interface;
  an igniter support with a third fixation interface designed to receive and fix the second fixation interface; characterized in that said at least one actuating device is designed to retain the first fixation interface by sandwiching it between at least one part of the second fixation interface and at least one part of the third fixation interface.

The present implementation proposes mounting the first fixation interface (that of the inflatable cushion) directly between the igniter and the igniter support. Therefore, the first fixation interface is retained and fixed by this sandwich hold, which permits the localization of the first, the second and the third fixation interface at the same location and simplifies the rest of the structure by accumulating the fixation functions on the same pieces.

The igniter is advantageously designed to inflate only the inflatable cushion. In other words, there is no secondary charge outside of the igniter.

According to an embodiment the igniter is designed to pressurize the inflatable cushion an absolute pressure of 30 bars maximum.

The at least one actuating device advantageously comprises a projecting fourth fixation interface designed to receive at least one eyelet formed in the first fixation interface. The retention and the fixation of the first fixation interface is secured with this projecting part that receives an eyelet of the first fixation interface. Moreover, the sandwich hold prevents the eyelet from exiting from the projecting part, thus making the retention and the fixation of the first interface reliable. According to this implementation the first fixation interface can be slipped onto the fourth fixation interface, which offers a function of prepositioning the inflatable cushion on the actuating device during the mounting. Therefore, the mounting can be broken down into a first stage of prepositioning the inflatable cushion via its first fixation interface followed by a second stage of mounting the igniter or the actuating device on the module, for example.

The eyelet is advantageously designed to be mounted tightly on the fourth fixation interface. According to this implementation the prepositioning is more robust.

The third fixation interface advantageously comprises a fixation orifice, the first fixation interface comprises at least one inflatable cushion tongue on which said at least one eyelet is arranged, and said at least one tongue is inserted into the fixation orifice of the igniter support. The passage of the tongue into the third fixation interface (which will therefore receive the second fixation interface of the igniter) also secures the fixation of the inflatable cushion.

The igniter advantageously has an axial direction, the fourth fixation interface is formed by two indices arranged in a dissymmetric manner relative to the axial direction of the igniter in order to offer an angular keyway between the igniter and the igniter support, and the first fixation interface comprises two eyelets, each designed to be mounted tightly on one of the two indices. The axial direction can be defined, for example, by an axis of symmetry of an ignition case or by a direction of connection pins of the igniter. The fourth fixation interface is advantageously used to offer an angular keyway between the igniter and the igniter support, which reduces the risks of an incorrect mounting.

The indexes are advantageously arranged on the igniter support and the igniter comprises recesses arranged to receive the indexes. This reduces the risk of the inflatable cushion escaping during its deployment since the degrees of freedom of the tongues are limited in this manner and ensure a keyway of the inflatable cushion relative to the igniter support.

The safety module advantageously comprises:
  an airbag with a vent,
  a linkage connecting the inflatable cushion and the vent.

The linkage connected to the inflatable cushion advantageously keeps the vent closed, the linkage is designed to detach itself from the inflatable cushion when the latter is inflated, and the igniter, when it is ignited, is designed to inflate the inflatable cushion.

The linkage advantageously is connected to the inflatable cushion by a meltable seam designed to break during an inflation of the inflatable cushion caused by an ignition of the igniter.

The igniter advantageously has a direct communication with the inflatable cushion. In other words, the igniter traverses the igniter support in order to deliver the inflation gases directly into the inflatable cushion.

The second fixation interface advantageously comprises clipping means on the igniter support.

The clipping means advantageously comprises at least one deformable part designed to elastically deform during the mounting of the igniter on the igniter support and to assume by elastic return a position of blocking against the igniter support when the igniter is in mounted position for preventing any withdrawal of the igniter.

The igniter advantageously comprises elongated connection pins and the plastic overmoulding forms at the level of the connection pins a connection imprint designed for receiving and retaining a connector. The connector is advantageously a male connector.

The igniter advantageously comprises:
at least one pyrotechnical material designed to be ignited by a heating element,
a case enclosing said at least one pyrotechnical material and arranged in a pit of the plastic overmoulding,
elongated connection pins, and the pit has an axial direction substantially parallel to the connection pins.

The case advantageously comprises a lateral wall and a bottom with a thickness greater than that of the lateral wall. The risks of rupture and/or of detachment of the case petals during the functioning of the igniter causing an opening under great pressure on the case are reduced with this implementation. This furthermore permits the limiting of the angular amplitude of the opening of the petals and the inflation of the case and therefore the reducing of the stresses on the plastic overmoulding during the igniting of the igniter.

The case advantageously comprises a bottom comprising weakened lines designed to bring about a petalling of the bottom during the functioning of the igniter, and the number of petals is less than eight. This implementation improves the resistance to rupture of the petals during the functioning.

The pit advantageously has a depth greater than or equal to one half the diameter of the case. This will prevent the petals from exceeding the overmoulding pit and therefore any attack on an element outside of the pyrotechnical igniter such as an airbag tissue.

Said at least one deformable part advantageously has a blocking face on the support and the pit has an end for the exit of the gases of the igniter arranged at a distance from said upper blocking face or equal to 15 millimeters. This implementation allows leaks to be limited by the fixation of the igniter on the support.

The pit advantageously has a depth comprised between 5 and 10 millimeters, terminals included.

The pit advantageously has a diameter two to three millimeters greater than that of the case. The deployment of the petals is optimal with this implementation: the petals do not support themselves on the pit during their opening and therefore do not risk damaging it. This furthermore allows the realization of a moulding tool for realizing the plastic overmoulding which is sufficiently massive for avoiding any erosion during the injection and therefore for avoiding any premature wear of the mould. Finally, this allows the igniter to be correctly held during the operation of overmoulding and therefore allows pieces of constant dimensions.

The igniter advantageously comprises a cross-connector of glass to which the case is fixed by a welding and said at least one deformable part is arranged on the plastic overmolding facing a case zone between the welding and the case bottom. During the operation of the igniter the case has a tendency to inflate above the welding with the cross-connector of glass. The maximum deformation and therefore the maximum stress of the overmolding will be found at the level of the contact zone between the case and the overmolding, between the welding and the case bottom. According to this implementation, facing this zone, the deformable part or parts also act as reinforcement ribs.

The welding is advantageously arranged to be facing the support when the igniter is in the inserted position. The support participates in the resistance of the welding and supplies it with a recovery of stress.

The plastic overmoulding is advantageously made of polyamide 6.6 with 30% by mass of glass fibres.

Advantageously, according to one embodiment
the igniter support comprises a checking opening,
the deformable part comprises a male part of which a first part faces the checking opening when the deformable part has passed into the blocking position. This implementation allows a check of the presence of the deformable part after mounting.

The male part advantageously comprises a second part, with a greater surface than the first part, which faces the checking opening when the igniter is in the inserted position with the deformable part remaining deformed. This implementation allows a check to be made that the deformable part is in a good blocking position after insertion.

The module advantageously comprises a casing and the igniter support is a part of the casing. The general structure of the module is simplified.

According to an embodiment the airbag is designed to retain an occupant of the vehicle during a collision and the inflatable cushion is designed to carry out an order of a mechanism of the safety module.

A second aspect of the invention is an automobile comprising at least one safety module according to the first aspect of the invention.

DRAWINGS

Other characteristics and advantages of the present invention will appear more clearly from a reading of the detailed following description of an embodiment of the invention given by way of a non-limiting example and illustrated by the attached drawings, in which.

DETAILED DESCRIPTION

Figure 1:
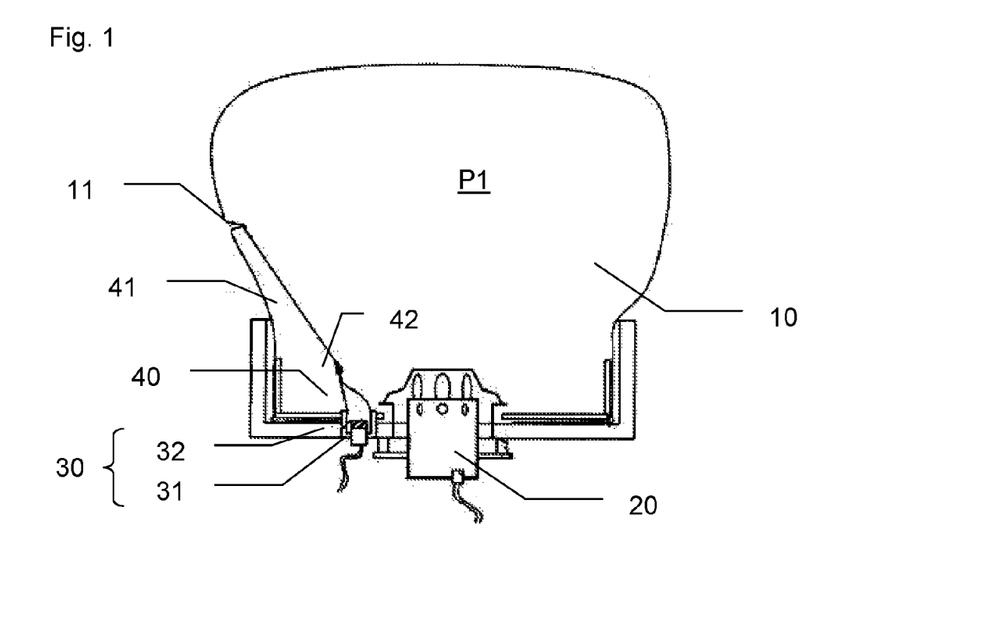
FIG. 1 shows a safety module according to the present invention in a first configuration of deployment.

FIG. 1 shows a safety module for an automobile comprising an airbag 10, a gas generator 20 designed to inflate the airbag 10, a pyrotechnical actuating device 30 (comprising an igniter 31 and an igniter support 32) and an inflatable cushion 40 connected to a vent 11 of the airbag 10 by a linkage 41.

As is shown, the airbag 10 is deployed under the action of inflation gases generated by the gas generator 20. A pressure P1 prevails in the airbag 10, calculated for example to retain and cushion an occupant during a collision of the automobile with an obstacle. Under certain collision conditions or during a certain lapse of time during the retention of the occupant the pressure should be maintained in the airbag 10 and the vent 11 should remain closed. To this end the linkage 41 keeps it closed and it is kept stretched by the inflatable cushion 40.

Figure 2:
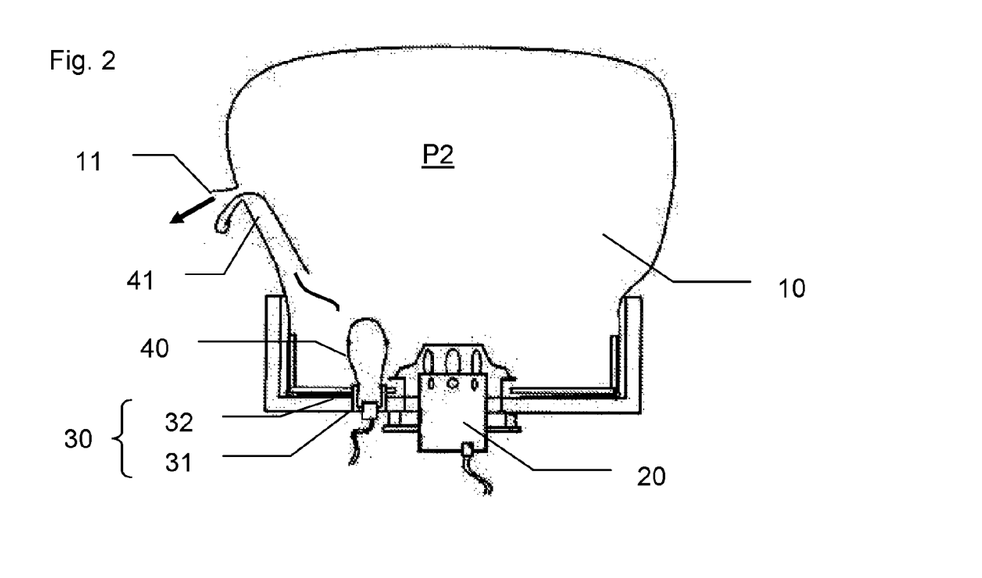
FIG. 2 shows the safety module of FIG. 1 in a second configuration of deployment.

FIG. 2 shows the safety module of FIG. 1 with the vent 11 open. In fact, under certain collision conditions if the occupant is detected outside of his normal position or at the end of the retention of the occupant it can be important to lower the pressure in the airbag 10. This is when the actuating device 30 is activated in order to inflate the inflatable cushion 40 in order to release the linkage 41 which is no longer stretched and allows the vent 11 to open in order to obtain a pressure P2 lower than P1.

The igniter 31 of the actuating device 30 has inflated the inflatable cushion 40 and a meltable seam 42 (visible in FIG. 1) has broken, thus freeing the linkage 41.

Figure 3:
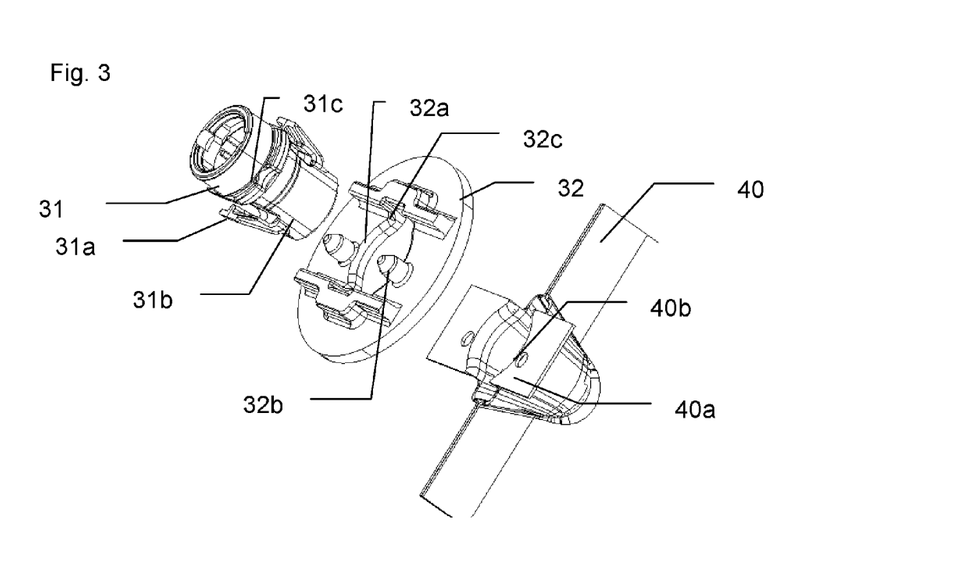
FIG. 3 shows an exploded view of a pyrotechnical actuating device and of an inflatable cushion of the safety module of FIG. 1.

FIG. 3 shows an exploded view of the igniter support 32, of the inflatable cushion 40 and of the igniter 31. The inflatable cushion 40 comprises two tongues 40a, each of which carries an eyelet 40b, all together forming a first fixation interface.

The igniter 31 comprises a cylinder 31b and two feet 31a. The feet 31a are deformable parts of the plastic overmoulding forming the body of the igniter 31. The cylinder 31b and the feet 31a form a second fixation interface.

The igniter support 32 comprises a fixation orifice 32a and two slots 32c which form a third fixation interface designed to receive and fix the second fixation interface of the igniter 31 (the cylinder 31b engages into the fixation orifice 32a and the feet 31a deform elastically during the insertion into the slots 32c in order to go into a position of blockage against the igniter support 32 once the igniter 31 has been completely inserted into the igniter support 32). The feet 31 move into a position of blockage by elastic return at the level of a shoulder (not visible) in each slot 32c.

The igniter 31 advantageously comprises connection pins which are perpendicular to the shoulders so that the stresses caused by the putting in place and/or the withdrawal of a connector are exerted in an axial direction of the feet 31a.

The igniter support 32 also comprises two indexes 32b forming a fourth fixation interface designed to receive the eyelets 40b of the first fixation interface. In fact, prior to the insertion of the igniter 31 the tongues 40a are inserted into the fixation orifice 32a and the eyelets 40b are forcefully threaded onto the indexes 32b. Therefore, the inflatable cushion 40 is pre-positioned on the igniter support 32 and the insertion of the igniter 31 sandwiches the first interface of the inflatable cushion 40 between a part of the second fixation interface (the cylinder 31b) and the third fixation interface (the fixation orifice 32a).

Figure 4:
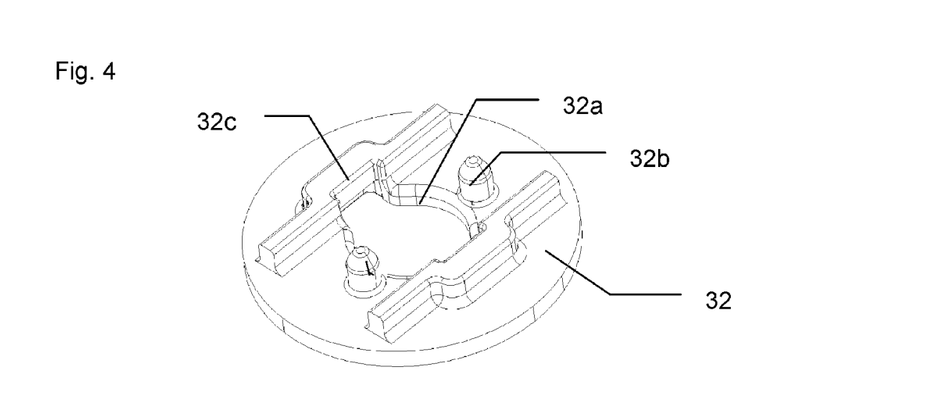
FIGS. 4, 5 and 6 each show a stage of the mounting of the pyrotechnical actuating device and of the inflatable cushion of FIG. 3.

FIG. 4 shows the igniter support 32 before any operation of mounting. It shows the igniter support 32 in detail, which comprises the fixation orifice 32a and the two slots 32c which form the third fixation interface, as well as two indexes 32b which form the fourth fixation interface.

It is also possible to note the presence of a bevel on the ridge of the fixation orifice 32a caused to be brought in contact with the second fixation interface of the igniter, which can also be bevelled in this zone in order to improve the relative positioning of the two components, and also to increase the tightness during functioning.

Figure 5:
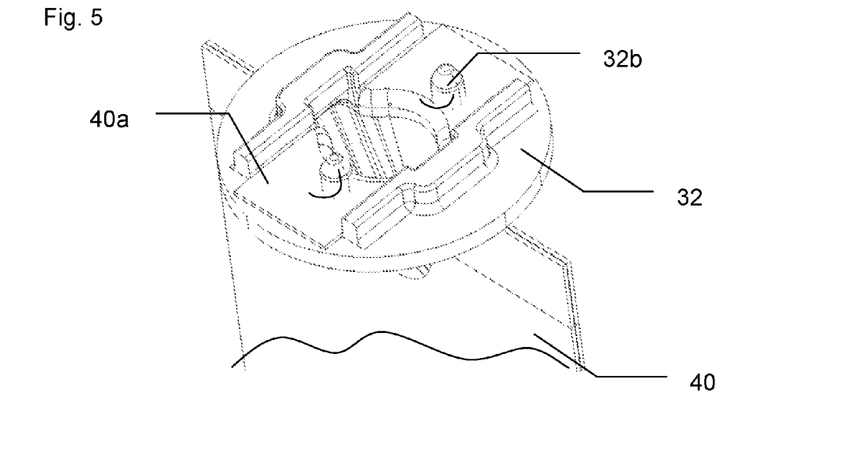

FIG. 5 shows the igniter support 32 with the inflatable cushion 40 pre-positioned on top. To this end the eyelets 40b were installed on the indexes 32b with the tongues 40a moved inside the fixation orifice 32a.

Figure 6:
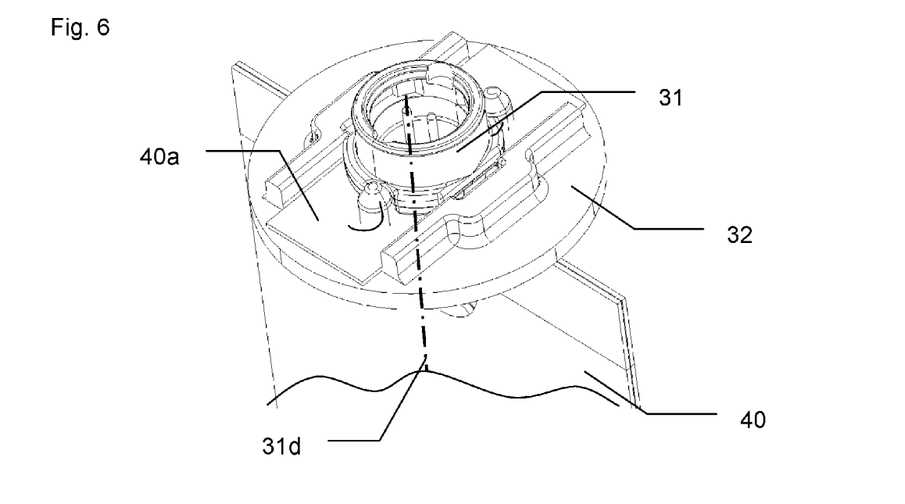

FIG. 6 shows the last stage of the assembly with the igniter 31 inserted into the igniter support 32. Once the igniter 31 has been completely inserted into the support 32, the feet 31a are put in a position of blockage by elastic return behind a non-visible shoulder of the slots 32c, which makes any withdrawal of the igniter 31 impossible.

It will also be noted that two recesses 31c (visible in FIG. 3) of the igniter 31 engage with the indexes 32b in order to guarantee a good angular orientation of the igniter 31 relative to the igniter support 32 along an axis 31d of the igniter 31. The angular keyway is obtained by arranging the indexes 32b non-symmetrically relative to the axis 31d.

Figure 7:
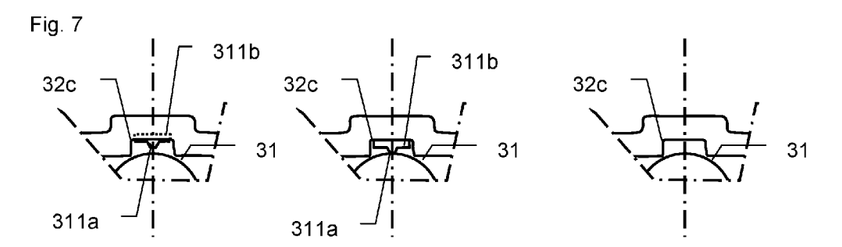
FIG. 7 shows a detail of the igniter support and of the igniter inserted in the igniter support according to three mounting scenarios.

FIG. 7 shows a detail of the top view of the igniter 31 inserted in the igniter support 32 at the level of a slot 32c and of the corresponding foot 31a (see FIG. 3) in order to illustrate three mounting scenarios.

The left figure shows a correct mounting. The foot 31a with a T-section is correctly placed in a position of blocking after insertion of the igniter 31. Only a first lower part 311a of the T is visible through the slot 32c. A second part 311b with a greater area than the first part 311a is behind the igniter support 20, represented in dotted lines. Therefore, it is possible to insert a checking fork comprising a central release into the slot 32c (which then acts as a checking opening) for verifying that the foot 31a is in the proper blocking position.

The figure in the middle illustrates a mounting scenario in which the foot 31a is incorrectly placed in a blocking position, which means that a withdrawal of the igniter 31 is possible. The rest of the T-shaped foot 31a is seen: the second part 311b with a greater area than the first part 311a, and it would be impossible to insert the checking fork because it would strike against the second part 311b of the T-shaped foot 31a. This type of error can therefore be detected.

The figure on the right shows a mounting scenario with the foot 31a absent due to a rupture, for example. The entire slot 32c is free and the checking fork would completely pass without the central, hollowed-out part striking the first part 311a of the foot 31a, which also makes this error detectable.

Figure 8:
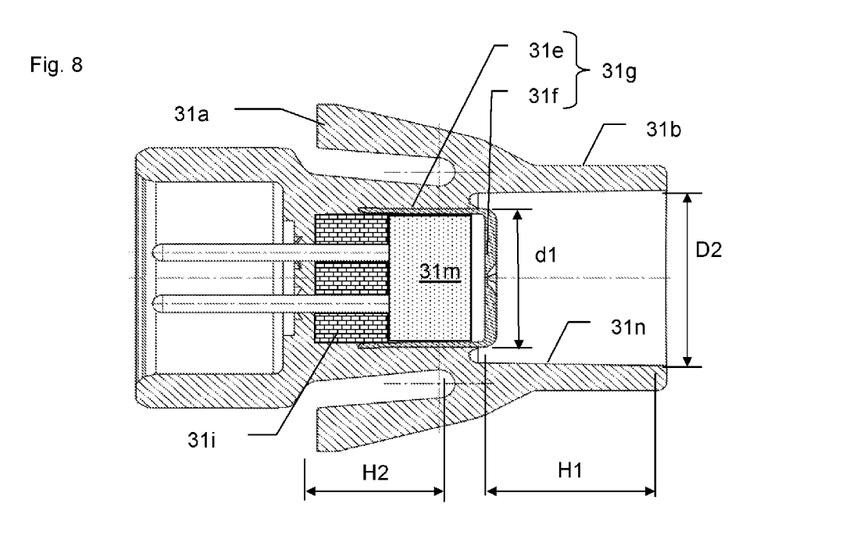
FIG. 8 shows a view of a section of the igniter.

FIG. 8 shows a sectional view of the igniter 31. It comprises a plastic overmoulding that surrounds a case 31g welded on a glass cross-connector 31i and enclosing a pyrotechnical material 31m. A pit 31n formed in the plastic overmoulding allows the case 31g to open in order to allow gases and/or hot particles created during the functioning of the igniter to pass.

The functioning of the igniter is initiated by the igniting of the pyrotechnical material 31m. Several techniques can be used such as, for example here the passage of an electrical current in a resistive element which therefore heats up and causes the ignition of the pyrotechnical material 31m. The pressure in the case 31g rapidly increases and forces the case 31g to break.

The case 31g has a cylindrical wall 31e and a bottom 31f In order to facilitate the opening of the case 31g, the bottom 31f is petalled, preferably in eight sectors or petals in order to limit the risk of rupture and/or detachment of the petals during the functioning of the igniter.

Furthermore, the thickness of the bottom 31*f* is greater than that of the wall 31*e*, which reduces even more the risk of rupture of petals as well as the angular amplitude of the opening of the petals.

The pit 31*n* has a depth H1 greater than or equal to one half the diameter dl of the case. Consequently, the petals, once open, do not extend beyond the pit and can therefore not attack an element outside of the igniter such as an airbag fabric which could be located in the vicinity. This furthermore allows a better guiding of the gases and/or particles generated during the igniting of the igniter so that they are directly directed toward an inflatable cushion, for example. Moreover, the pit 31*n* has a diameter D2 greater than the diameter dl so that the petals can open without being limited or striking the pit 31*n*. The diameter D2 is ideally greater than the diameter dl by 1.5 to 3 millimeters. This reduces the risk of rupture of the pit.

Note that the feet 31*a* and the slots 32*c* may not be arranged in a symmetric manner along the axis of the igniter but on the contrary can be arranged in an asymmetric manner in order to offer an angular keyway and correctly orient the pins of the igniter relative to the support and to the rest of the safety module. Finally, the feet 31*a* have a free length H2 comprised between 5 and 10 millimeters in order to offer a good flexibility. Ideally, the free length H2 is comprised between 7 and 9 millimeters in order to have a good elastic return and a good ability to be clipped at the end.

It is understood that various modifications and/or improvements evident to a person skilled in the art can be added to the different embodiments of the invention described in the present description without leaving the scope of the invention defined by the attached claims.

The invention claimed is:

1. A safety module for a motor vehicle, the safety module comprising:
    at least one inflatable cushion with a first fixation interface; and
    at least one actuating device including:
        an igniter with a plastic overmoulding forming a second fixation interface; and
        an igniter support with a third fixation interface designed to receive and fix the second fixation interface;
    wherein the at least one actuating device retains the first fixation interface by sandwiching the first fixation interface between at least one part of the second fixation interface and at least one part of the third fixation interface.

2. The safety module according to the claim 1, wherein the at least one actuating device includes a projecting fourth fixation interface receiving at least one eyelet formed in the first fixation interface.

3. The safety module according to claim 2, wherein the eyelet is mounted tightly on the fourth fixation interface.

4. The safety module according to claim 1, further comprising:
    an airbag with a vent; and
    a linkage connecting the inflatable cushion and the vent.

5. The safety module according to claim 4, wherein the linkage connected to the inflatable cushion keeps the vent closed, the linkage operative to detach from the inflatable cushion when the inflatable cushion is inflated, and wherein the igniter inflates the inflatable cushion.

6. The safety module according to claim 5, wherein the linkage is connected to the inflatable cushion by a meltable seam.

7. The safety module according to claim 4, wherein the igniter has a direct communication with the inflatable cushion.

8. The safety module according to claim 1, wherein the second fixation interface is adapted to be clipped on the igniter support.

9. The safety module according to claim 8, wherein the second fixation interface includes at least one deformable part elastically deformable during mounting of the igniter on the igniter support and operative to elastically return to a blocking position against the igniter support when the igniter is in mounted position for preventing any withdrawal of the igniter.

10. The safety module according to claim 9, wherein:
    the igniter support includes a checking opening; and,
    the deformable part includes a male part having a first part facing the checking opening when the deformable part has passed into the blocking position.

11. The safety module according to claim 10, wherein the male part further includes a second part with a greater area than the first part, the second part facing the checking opening when the igniter is in an inserted position with the deformable part remaining deformed.

12. The safety module according to claim 1, further comprising a casing and wherein the igniter support is a part of the casing.

13. The safety module according to claim 1, in combination with a motor vehicle.

14. The safety module according to claim 1, wherein the third fixation interface includes a fixation orifice, the first fixation interface inserted into the orifice.

15. The safety module according to claim 1, wherein the first interface includes a first tongue carrying a first eyelet and a second tongue carrying a second eyelet.

16. The safety module according to claim 15, wherein the igniter support further includes a fourth interface having first and second indexes receiving the first and second eyelets of the first interface.

17. A safety module for a motor vehicle, the safety module comprising:
    at least one inflatable cushion with a first fixation interface; and
    at least one actuating device including:
        an igniter with a plastic overmoulding forming a second fixation interface; and
        an igniter support with a third fixation interface designed to receive and fix the second fixation interface;
    wherein the at least one actuating device retains the first fixation interface by sandwiching the first fixation interface between at least one part of the second fixation interface and at least one part of the third fixation interface, and
    wherein the third fixation interface includes a fixation orifice, the first fixation interface includes at least one tongue of the inflatable cushion, and the at least one tongue is inserted into the fixation orifice of the igniter support.

18. A safety module for a motor vehicle the safety module comprising:
    at least one inflatable cushion with a first fixation interface; and
    at least one actuating device including:
        an igniter with a plastic overmoulding forming a second fixation interface; and
        an igniter support with a third fixation interface designed to receive and fix the second fixation interface;

wherein the at least one actuating device retains the first fixation interface sandwiching the first fixation interface between at least one part of the second fixation interface and at least one part of the third fixation interface; and wherein the igniter has an axial direction, a fourth fixation interface formed by two indexes arranged in an asymmetric manner relative to the axial direction of the igniter so as to provide an angular keyway between the igniter and the igniter support, and wherein the first fixation interface includes two eyelets, each eyelet mounted on a respective one of the two indexes.

19. A safety module for a motor vehicle, the safety module comprising:

an inflatable cushion with a first fixation interface including a first tongue carrying a first eyelet and a second tongue carrying a second eyelet; and an actuating device including:

an igniter having a second fixation interface; and an igniter support with a third fixation interface designed to receive and fix the second fixation interface, the third fixation interface including a fixation orifice receiving a least one of the first and second tongues.

20. The safety module according to claim 19, wherein the igniter support further includes a fourth interface having first and second indexes receiving the first and second eyelets of the first interface.

\* \* \* \* \*